United States Patent [19]

Strassheimer

[11] Patent Number: 4,880,593
[45] Date of Patent: Nov. 14, 1989

[54] METHOD FOR PREPARING BLOW MOLDED PLASTIC CONTAINER

[75] Inventor: Herbert Strassheimer, Windermere, Fla.

[73] Assignee: Plasticon Patents, S.A., Geneva, Switzerland

[21] Appl. No.: 142,004

[22] Filed: Jan. 11, 1988

[51] Int. Cl.⁴ .............................................. B29C 49/12
[52] U.S. Cl. ..................................... 264/532; 264/523
[58] Field of Search ................................. 264/532, 523

[56] References Cited

U.S. PATENT DOCUMENTS 3,492,387  1/1970  Larson ................................... 264/532
4,261,948  4/1981  Krishnakumar et al. ........... 264/532
4,406,854  9/1983  Yoshino ................................ 264/532
4,780,257  10/1988  Beck ..................................... 264/532

FOREIGN PATENT DOCUMENTS 58-185229  10/1983  Japan .
60-61228    4/1985  Japan .

Primary Examiner—Jan H. Silbaugh
Assistant Examiner—Neil M. McCarthy
Attorney, Agent, or Firm—Bachman & LaPointe

[57] ABSTRACT

A method for preparing a blow molded plastic container having a thickened bottom structure from a plastic preform. The plastic preform and resultant container have a neck portion defining an opening, a tubular body portion depending therefrom and an integral bottom structure depending from the tubular body portion. A stretch rod is seated inside the preform. The stretch rod stretches the portions of the preform adjacent the bottom thereof by means of a controlled stroke, in an amount less than the amount of stretching of the tubular body portion, to impart to the container bottom structure and adjacent body portions continuous variations of wall thickness the thick parts thereof on average being thicker than the average wall thickness of the container body.

5 Claims, 3 Drawing Sheets

METHOD FOR PREPARING BLOW MOLDED PLASTIC CONTAINER

BACKGROUND OF THE INVENTION

This invention relates to the preparation of thermoplastic containers for the retention of fluids under pressure, such as carbonated beverages and the like. These containers may be prepared from a preform or parison which may be injection molded, followed by blow molding said parison into a suitably shaped container. A typical thermoplastic material is poly (ethylene terephthalate) or PET, although others can be used.

It is particularly desirable to provide means for thickening the bottom wall of these containers in a controllable manner in order to strengthen the bottom wall structure.

The container configuration generally includes a neck portion with a cap-receiving means, a shoulder portion depending therefrom, a side wall or main body portion depending from the shoulder portion and a bottom wall joined to the side wall. In many of these containers the bottom wall has a champagne bottle bottom configuration with an internal, axially inwardly directed, generally or domed or conical part.

The bottom wall of these containers represents a weak part of the container. Also, it is desirable that the bottom shape provide stability for the bottle in an upright, free-standing position.

Thus, beverage under pressure within the container has a tendency to deform the bottom wall, as for example by everting the inwardly directed conical part, thus rendering the bottle unstable and prone to tip.

Many attempts have been made to overcome these problems while at the same time providing a construction which is inexpensive and economical to process. For example, U.S. Pat. No. 3,881,621 provides a ribbed strengthening at the bottom wall; however, this still represents insufficient strengthening. U.S. Pat. No. 4,134,510 provides a plurality of concentric annular strengthening ribs and a plurality of additional intersecting radial ribs in a complex and expensive procedure. U.S. Pat. Nos. 4,620,639, 4,261,948, 4,603,831, and 4,334,627 utilize a plurality of inwardly projecting rigid ribs so that the bottom wall is thicker at the ribbed portion than the remainder of the bottom wall; however, this results in a container having substantial and sharply defined differences in wall thickness with resultant major temperature differences during processing rendering processing difficult.

Copending U.S. patent application Ser. No. 044,469, for Blow Molded Plastic Container and Preform Therefor, By Herbert Strassheimer, Filed May 1, 1987 represents a significant advantage in this art. The plastic preform of said copending application comprises: a neck portion defining an opening; a tubular body portion depending therefrom; and a integral bottom structure depending from the tubular body portion; said preform having an outside wall face and an inside wall face, with at least one of the inside wall face and the outside wall face of the tubular body portion adjacent the bottom structure and extending onto said bottom structure having a plurality of thickened regions, as for example, formed by several flat faces. The blow molded plastic container of said copending application comprises: a neck portion defining an opening; a bottom portion; a tubular body portion interconnecting said neck and bottom portions, said bottom portion having an internal, axially inwardly directed conical part; said container having an inside wall face and an outside wall face, with the inside wall face of said tubular body portion adjacent said bottom portion and extending onto said bottom portion having circumferentially spaced, radially extending, continuous alterations in wall thickness with a regularly undulating cross-section across the entire circumference of the inside wall face which is progressive and gradual.

It is highly desirable to develop controllable means for improving the strength of the bottom structure producing the above-described container or the like from its corresponding parison, so as to distribute the wall thickness of the latter to thicken predetermined bottom portions thereof and to strenghen them, as by orientation.

It is therefore a principal object of the present invention to provide a method for preparing blow molded plastic containers from a plastic preform having a reinforced bottom structure controllably thickened in predetermined regions and capable of being oriented.

It is a further object of the present invention to provide a method as aforesaid which is simple, convenient and expeditious and is readily suitable for ue on a commercial scale wherein the bottom structure is characterized by thickened bottom regions without detrimental loss of properties in the remainder of the container.

Further objects and advantages of the present invention will appear hereinbelow.

SUMMARY OF THE INVENTION

In accordance with the present invention, it has now been found that the foregoing objects and advantages may be readily obtained.

The method of the present invention prepares a blow molded plastic container from a plastic preform, said container having continuous, reinforcing alterations of its bottom wall thickness. The container has a neck portion defining an opening, a tubular body portion depending therefrom and an integral bottom structure depending from the tubular body portion. In accordance with the method of the present invention, a plastic preform is provided for forming the blow molded plastic container, said preform having a neck portion defining an opening, a tubular body portion depending therefrom and an integral bottom structure depending from the tubular body portion, adjusting the temperature of the preform, placing the preform inside a blow mold and inserting a stretch rod inside the preform, and stretching said preform with said rod and blowing said preform into the configuration of said mold, wherein said rod stretches said bottom regions in an amount that is different than the amount of stretching of the tubular body portion, and preferably to stretch the portions of the preform adjacent the bottom thereof by means of a controlled stroke, in an amount less than the amount of stretching of the remainder of the tubular body portion, to impart to the bottom structure and adjacent body portions continuous variations of thickness the thick parts thereof on average being thicker than the average wall thickness of the container body portion. Preferably, the preform has an inside wall face and an outside wall face, wherein the preform body portion adjacent the bottom structure has a thickened inside wall face with an abutment at its transition to the tubular body portion including means, for example, an interference taper or a step, provided to keep the stretch rod from extending the thickened inside wall face while the stretch rod continues to extend the tubular body portion, by contacting a corresponding portion of the stretch rod with said abutment. In addition, a preferred embodiment includes the step of spacing said corresponding rod portion from said abutment a distance corresponding to said controlled stroke and stretching the bottom structure and adjacent body portion of said preform in the controlled stroke by moving the corresponding rod portion into contacting relationship with the abutment. It is further a preferred embodiment to include the steps of contacting the corresponding rod portion with the abutment and spacing the rod from the bottom structure of the preform a distance corresponding to the controlled stroke. The bottom structure of the preform is stretched after being contacted by the rod.

It is an additional preferred embodiment to place said rod into nearly contacting relationship with a substantial part of the preform bottom structure and adjacent body portion, stretch the preform prior to blowing to establish frictional contact between the rod and preform, wherein the rod does not stretch the bottom structure and adjacent tubular body of the preform until blowing commences and therefore in an amount less than the amount of stretching of the remainder of the tubular body portion, thus providing a container bottom structure of adjacent body thickness greater than the body wall thickness.

It is a significant finding of the present invention that the method of the present invention overcomes the disadvantages noted hereinabove and obtains a highly desirable strengthened bottom structure and adjacent tubular body in a blow molded container, wherein the strengthened bottom structure and adjacent tubular body are thickened in preselected regions and if desired are strengthened by orientation. Moreover, these significant advantages are obtained in a simple, expeditious and inexpensive manner.

The foregoing features and advantages of the present invention and others will be discussed hereinbelow.

DETAILED DESCRIPTION

Figure 1:
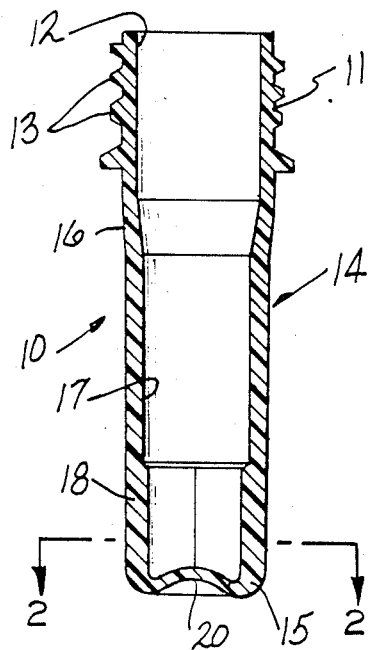
FIG. 1 is a sectional view of a preform of the present invention.

Referring now to the drawings in detail, a plastic parison or preform 10 is formed by injection molding from a synthetic resin which can be biaxially oriented, as for example poly (ethylene terephthalate). The preform 10 has a neck portion 11 defining an opening 12 and it may be provided with external threads 13 to serve as the site for attachment of a cap on the finished, blow molded plastic container. The preform 10 has a tubular body portion 14 depending from the neck portion 11 and an integral bottom structure 15 depending from the tubular body portion. The preform 10 has an outside wall face 16 and an inside wall face 17. The inside wall face 17 of the tubular body portion 14 is provided with a thickened portion 18 which extends onto bottom structure 15 and is characterized by a plurality of flat faces 19 which come together at intersecting points 19a as clearly shown in FIG. 2 which shows a preferred hexagonal configuration. Three or more of said flat faces may be used, although the hexagonal configuration is preferred. The bottom structure 15 is preferably provided with an axially inwardly directed conical part 20, although a flat bottomed construction can readily be used.

Figure 2:
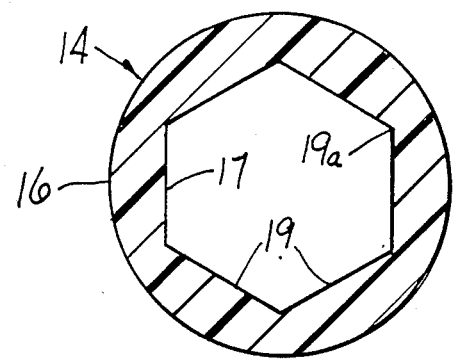
FIG. 2 is an enlarged sectional view along lines 2—2 of FIG. 1.

The specific preform 10 shown in FIGS. 1 and 2 represents a preferred embodiment of the present invention. However, advantages of the present invention can also be obtained without thickened portion 18 and of course without the preferred hexagonal configuration discussed above.

The thus formed preform is brought to a temperature at which orientation during blow molding can be accomplished which may be done by heating a previously formed parison or forming the hot parison in line with the blow molding operation and suitably adjusting the temperature thereof. The heated preform is then placed in a blow mold having the configuration of the desired container as blow mold 30 shown in FIG. 3, the interior side of bottom portion 15 is pushed down by stretch blow rod 31, and compressed air is blown therein into conformance with the blow mold, effecting biaxial orientation, at the same time resulting in plastic container 40 (see FIG. 4).

Thus, blow molded plastic container 40 is formed having a neck portion 41 defining an opening 42, a bottom structure 43, a tubular body portion 44 interconnecting the neck portion 41 and the bottom structure 43. Neck portion 41 is provided with external threads 45 to serve as the site for attachment of a cap on the container, as with preform 10. The bottom structure 43 preferably has an internal, axially inwardly directed generally conical part or dome 46.

Figure 5:
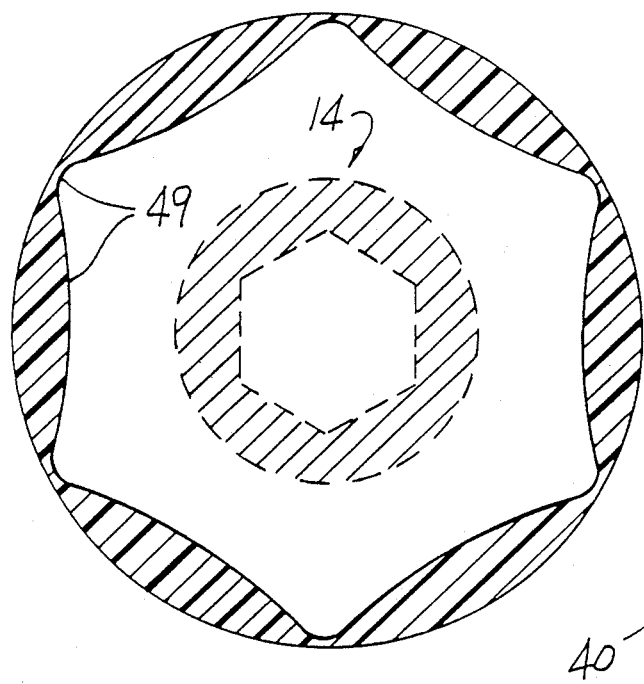
FIG. 5 is an enlarged sectional view taken along lines 5—5 of FIG. 4, with the corresponding sectional view of FIG. 2 superimposed therein in phantom.

Container 40 represents a preferred embodiment and has an inside wall face 47 and an outside wall face 48. The inside wall face 47 of tubular body portion 44 adjacent bottom structure 43 and extending onto the bottom structure is provided with circumferentially spaced, radially extending, continuous alterations in wall thickness 49 as clearly shown in FIG. 5. As can be seen in FIG. 5, the said alterations in wall thickness are progressive or gradual exhibiting no sharp edges. The alterations in wall thickness 49 extend over bottom structure 43 and also over conical part 46 to provide reinforcement thereof.

Figure 4:
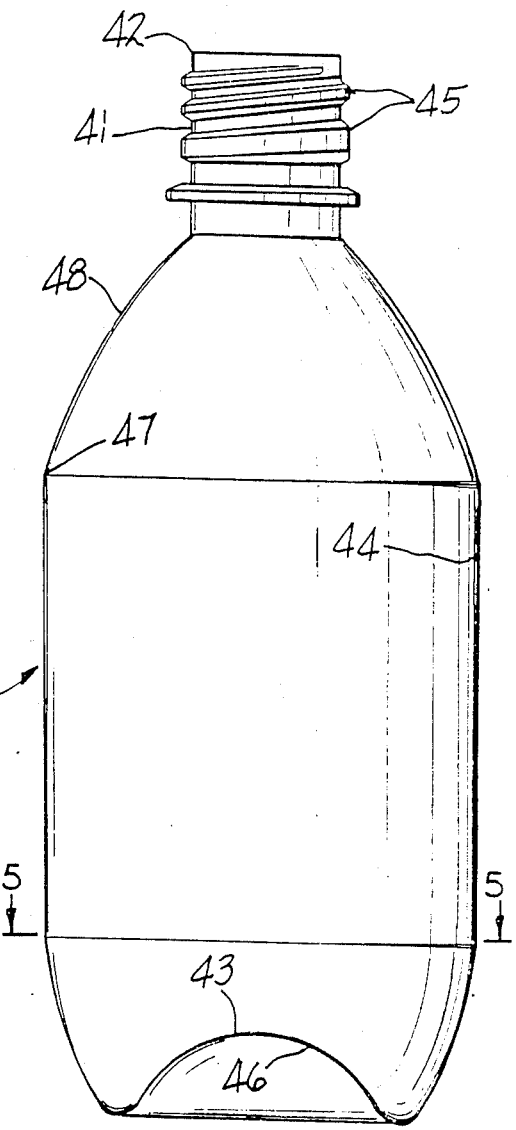
FIG. 4 is an elevational view of a container formed in FIG. 3.

FIG. 5 shows an enlarged sectional view taken along the lines 5—5 of FIG. 4 wherein the solid lines clearly show the gradual or progressive alterations in wall thickness which characterize the lower portion of the container and the bottom structure thereof. Superimposed inside the cross sectional view of FIG. 5 in phantom is an enlarged sectional view of the preform of FIG. 2 wherein it is clearly seen that the points of contact of the flat inside faces of the preform form the reduced thickness wall sections of the final container, and the flat faces progressively form the thickened portions.

Figure 6:
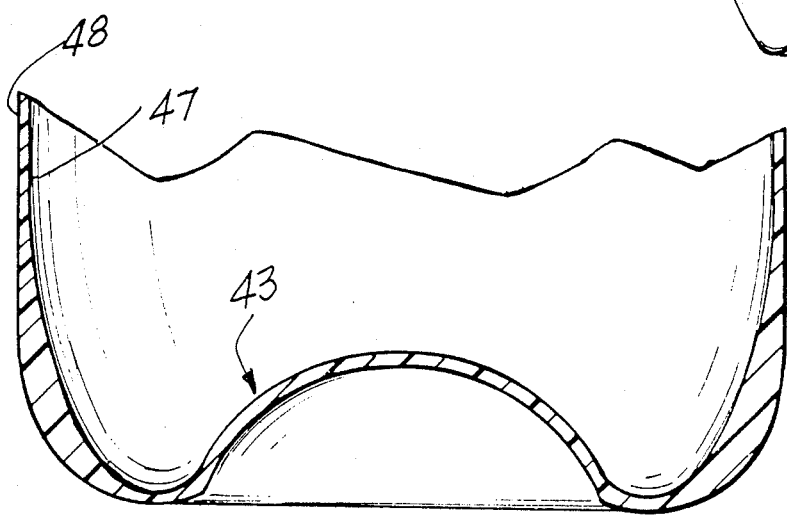
FIG. 6 is a partial, enlarged sectional view of the bottom portion and adjacent tubular body portion of the container of FIG. 4.

FIG. 6 is a partial, enlarged sectional view of bottom structure 43 and adjacent tubular portion 47 of container 40 wherein the thickened wall is clearly shown.

FIG. 5 shows a preferred embodiment wherein the inside wall face of the tubular body portion of the preform adjacent preform bottom structure and extending onto said bottom structure is characterized by a hexagonal configuration and the outside wall face is round. Also, the outside wall face of the container is characterized by a round configuration at the tubular body portion adjacent the bottom portion, and the corresponding inside face of the container is characterized by the aforesaid alterations in wall thickness. However, naturally other embodiments may readily be employed within the scope of the present invention, for example as shown in Applicant's copending application Ser. No. 044,469, referred to hereinabove, the disclosure of which is incorporated herein by reference.

In addition, due to the method of the present invention the container bottom structure 43 and adjacent tubular portion 47 is characterized by substantial thickening and strengthening vis-a-vis the remainder of the container. This represent a considerable advantage since this portion of the container is subjected to considerable stress.

Figure 7:
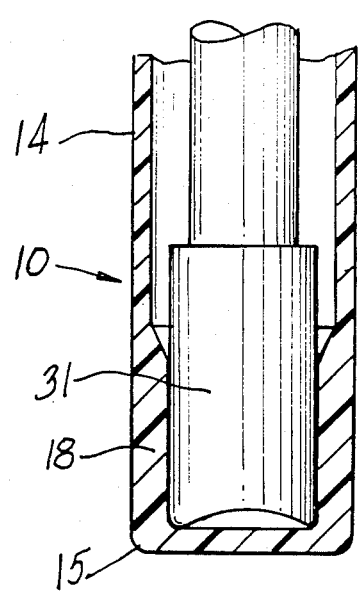
FIG. 7 is a partial sectional view of a preform stretch rod assembly used in the method of the present invention as shown in FIG. 3.

Referring to FIG. 7, stretch rod 31 is in substantially contacting relationship with preform bottom structure 15 and adjacent thickened portion 18. Thus, in accordance with the embodiment of FIG. 7 the rod 31 stretches the preform 10 prior to blowing with frictional contact between rod 31 and thickened portion 18. The rod therefore stretches bottom structure 15 and adjacent tubular body 18 of preform 10 in a controlled stroke in an amount less than the amount of stretching of the remainder of tubular body portion 14 to impart to the container bottom structure and adjacent body portions continuous variations of thickness on average greater than the container body wall thickness. To obtain frictional contact between the rod and the preform, the rod is first advanced, thereby increasing the inside volume of said preform, creating a vacuum therein. Atmospheric pressure outside the preform therefore urges the preform against the rod which results in sufficient frictional contact to prevent continued stretching of the preform portions affected thereby, while other portions, e.g. the tubular portion, continues to be stretched. Control over the length of the preform that is to be thus kept from stretching may be effected by admitting near-atmospheric pressure inside the preform at a predetermined moment, to offset the atmospheric pressure. It is noted that the pressure used to blow the container into final shape is between approx. 5 to 30-times higher than atomospheric, it being applied only after the preform will have been sustantially stretched.

Figure 8:
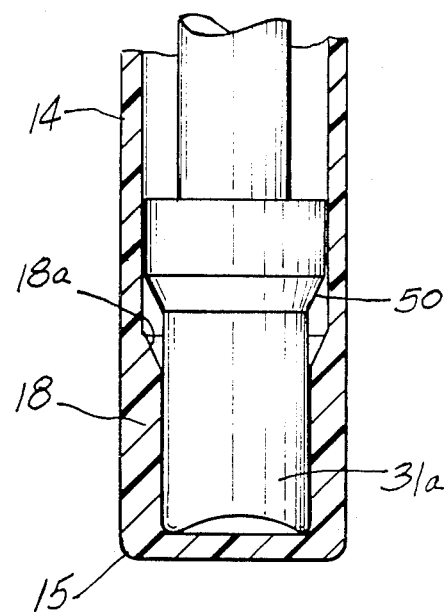
FIG. 8 is a partial sectional view similar to FIG. 7 showing a preferred preform stretch rod assembly of the present invention.

In accordance with the embodiment of FIG. 8, preform thickened portion 18 has an abutment 18a at its transition to tubular body portion 14. Rod 31a is placed in substantially contacting relationship with preform thickened portion 18 and bottom structure 15 in a manner after FIG. 7; however, rod 31a is provided with a corresponding portion 50 spaced from thickened portion 18 by a distance corresponding to the controlled stroke. Thus, in accordance with the embodiment of FIG. 8 preform bottom structure 15 and thickened portion 18 is stretched in a controlled stroke by rod 31a corresponding to movement of rod portion 50 into contact with abutment 18a. This keeps the stretch rod from extending the thickened inside wall face while the stretch rod continues to extend the tubular body portion. It should be noted that the embodiment of FIG. 8 provides stretching of the preform prior to blowing similar to the embodiment of FIG. 7.

Figure 9:
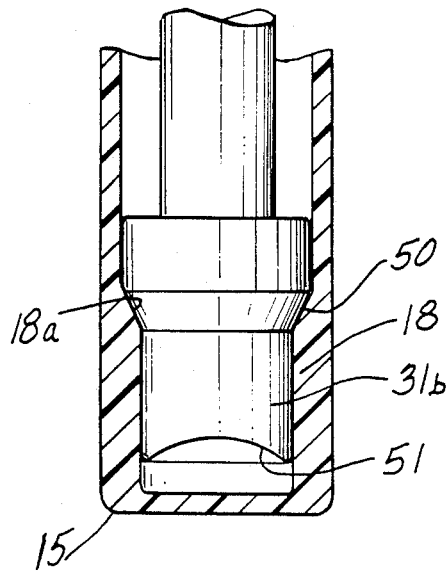
FIG. 9 is a partial sectional view similar to FIG. 7 showing an additional embodiment of the present invention.

In accordance with the embodiment of FIG. 9, portion 50 of rod 31b is in substantially contacting relationship with abutment 18a and rod bottom portion 51 is spaced from preform bottom structure 15 by a distance corresponding to the controlled stroke. Thus, in accordance with the embodiment of FIG. 9 the bottom structure of the preform is stretched after contacting the bottom structure of the rod resulting in a substantially thickened bottom structure. Naturally, also the adjacent body portion is substantially thickened.

Figure 3:
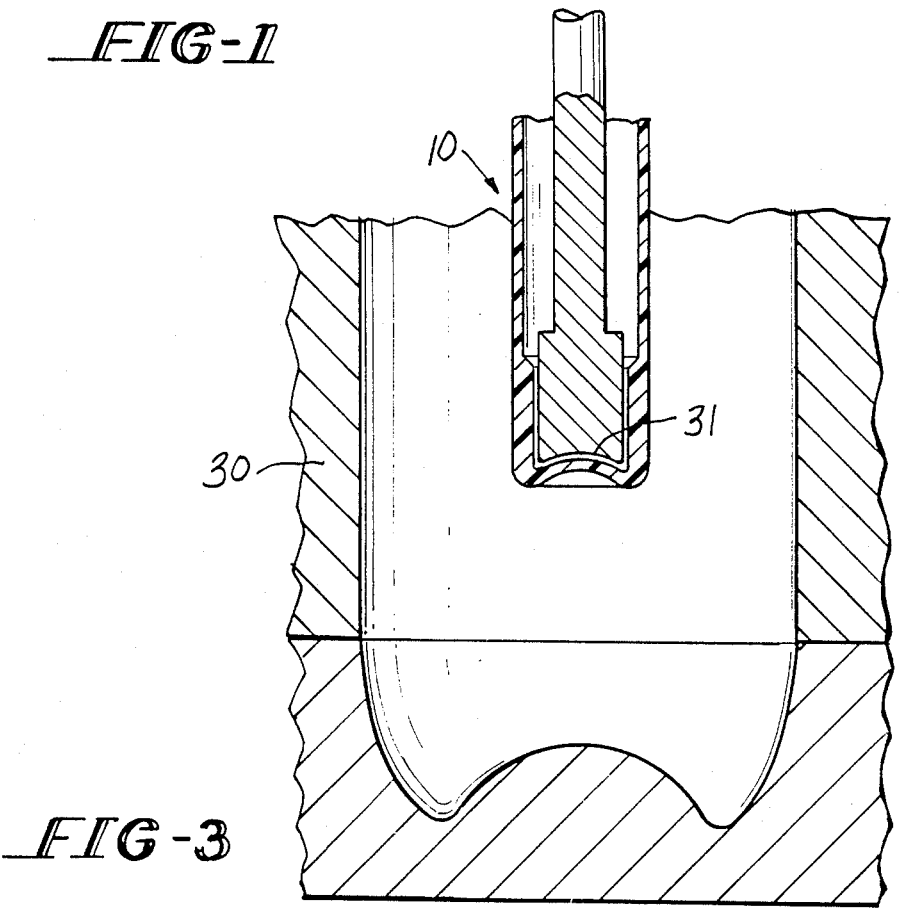
FIG. 3 is a partial sectional view taken through a mold for molding a container and having associated therewith the preform of FIG. 1 which is to be stretched and blown therein to form a container of the present invention.

In accordance with the embodiments of FIGS. 7 through 9, the preform bottom structure is flat and the bottom of the rod is curved. Naturally, both of these can be curved as shown in FIG. 3.

Thus, it can be seen in accordance with the present invention that the controlled stroke feature of the present invention results in substantial strengthening of the resultant container bottom structure and adjacent tubular body as clearly shown in FIG. 6.

Means for admitting compressed air are shown schematically as reference numeral 60 in FIG. 7 on rod 31. Naturally, the compressed air can be provided as a separate unit from the stretch rod in a manner known in the art.

The method of the present invention is particularly advantageous due to the fact that the reinforcements described herein may be used in the regions of the container that, for resistance to service conditions, e.g. impact, rely upon mechanical properties that are obtainable only by adequate bi-axial orientation. Such are the bottom edges which are exposed to sharp impact whenever the full container is dropped. In a container made according to the present method, substantial bi-axial orientation may extend well beyond the central region of the bottom, making it possible to provide a bottle whose base is wide enough for stability, the endangered rim of the base being sufficiently oriented. In contrast, heretofore known reinforcements, e.g. ribbed structures are oriented substantially along the length of the ribs only, tending to fracture perpendicularly thereto upon impact, and may therefore not be extended beyond a relatively narrow distance from the center, rendering the container unstable on the filling line and in use.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A method of preparing a blow molded plastic container having a neck portion defining an opening, a tubular body portion depending therefrom and an integral bottom structure depending from the tubular body portion, said method comprising:

providing a plastic preform for forming the blow molded plastic container said preform having a neck portion defining an opening, a tubular body portion depending therefrom and an integral bottom structure depending from the tubular body portion, said integral bottom structure having a closed bottom end;

providing a stretch rod having an enlarged base portion; placing the preform inside a blow mold and inserting the stretch rod inside the preform such that a bottom of the stretch rod contacts an inside surface of said closed bottom end of said preform and stretching said preform with said rod and blowing said preform into the configuration of said mold;

wherein the enlarged base portion of said rod is adapted to effect stretching of said integral bottom structure and preliminarily stretches said integral bottom structure and said tubular body portion simultaneous in different amounts to obtain in said integral bottom structure continuous variations of thickness having thick parts thereof which are thicker than an average wall thickness of said tubular body portion of said blow molded plastic container; said enlarged base portion of said rod stretches said integral bottom structure of said preform by means of a controlled stroke in an amount less than the amount of stretching of the tubular body portion of said preform to obtain bi-axial orientation in said container upon blowing of said preform, said bi-axial orientation being achieved in a region extending well beyond a central region of the bottom of said blow molded container; said preform having an inside and an outside wall face, and the body portion of said preform adjacent said bottom structure has a thickened inside wall face with an abutment at its transition to the tubular body portion;

said method further including the step of contacting a corresponding portion of the stretch rod with said abutment after said preliminary stretching of said tubular body portion and said integral botttom structure to thereby keep the stretch rod from further stretching the integral bottom structure while continuing to stretch the tubular body portion of said preform.

2. A method according to claim 1 wherein said rod stretches the portions of the preform adjacent said integral bottom structure by means of a controlled stroke in an amount less than the amount of stretching of the tubular body portion.

3. A method according to claim 1 wherein said continuous variations of thickness are symmetrically disposed.

4. A method according to claim 1 wherein the enlarged base of said rod is substantially coextensive with the thickened inside wall face of the preform.

5. A method of preparing a blow molded plastic container having a neck portion defining an opening, a tubular body portion depending therefrom and an integral bottom structure depending from the tubular body portion, said method comprising:

providing a plastic preform for forming the blow molded plastic container said preform having a neck portion defining an opening, a tubular body portion depending therefrom and an integral bottom structure depending from the tubular body portion, said integral bottom structure having a closed bottom end, said preform also having an inside and an outside wall face, and the body portion of said preform adjacent said bottom structure has a thickened inside wall face with an abutment at its transition to the tubular body portion;

providing a stretch rod having an enlarged base portion; placing the preform inside a blow mold and inserting the stretch rod inside the preform such that a portion of the stretch rod contacts said abutment and a bottom of the stretch rod remains spaced from an inside surface of said closed bottom end of said preform and stretching said preform with said rod and blowing said preform into the configuration of said mold; wherein the enlarged base portion of said rod is adapted to effect preliminary stretching of said tubular body portion and upon contact of the bottom of the stretch rod with the inside surface of said closed bottom end of said preform, said stretch rod stretches said integral bottom structure of said preform to obtain in said integral bottom structure continuous variations of thickness having thick parts thereof which are thicker than an average wall thickness of said tubular body portion of said blow molded plastic container and bi-axial orientation in said container upon blowing of said preform, said bi-axial orientation being achieved in a region extending well beyond a central region of the bottom of said blow molded container.

* * * * *